United States Patent [19]
Winkle

[11] 3,850,108
[45] Nov. 26, 1974

[54] ARMATURE ASSEMBLY AND MAGNETICALLY SUSPENDED VEHICLE

[75] Inventor: Günther Winkle, Munich, Germany

[73] Assignee: Krauss-Maffei Aktiengesellschaft, Munchen, Germany

[22] Filed: Jan. 16, 1973

[21] Appl. No.: 324,131

[30] Foreign Application Priority Data
Jan. 17, 1972 Germany............................ 2202027

[52] U.S. Cl. .................... 104/148 MS, 104/148 LM
[51] Int. Cl. ............................................. B61b 13/08
[58] Field of Search ................ 104/148 MS, 148 LM

[56] References Cited
UNITED STATES PATENTS
| | | | |
|---|---|---|---|
| 3,585,423 | 6/1971 | Bolton et al. ................ | 104/148 LM |
| 3,638,093 | 1/1972 | Ross ............................. | 104/148 MS |
| 3,741,613 | 6/1973 | Pfaler .......................... | 104/148 MS |

FOREIGN PATENTS OR APPLICATIONS
643,316   3/1937   Germany..................... 104/148 MS

*Primary Examiner*—M. Henson Wood, Jr.
*Assistant Examiner*—George H. Libman
*Attorney, Agent, or Firm*—Karl F. Ross; Herbert Dubno

[57] ABSTRACT

A magnetically suspended vehicle driven by a linear induction motor has an armature carried by the track and juxtaposed with the suspension and/guidance electromagnet which is provided with a rail of high electrical conductivity serving as a reaction rail for a one-sided linear induction motor. This armature rail is of U-profile and the electrically conductive rail is applied along the inner or outer surface of one of the lateral shanks or the web interconnecting the shanks, the rail being of laminated construction to reduce eddy currents therein.

10 Claims, 10 Drawing Figures

PATENTED NOV 26 1974 3,850,108

ARMATURE ASSEMBLY AND MAGNETICALLY SUSPENDED VEHICLE

CROSS-REFERENCE TO RELATED APPLICATIONS

The present application is related to the commonly assigned copending applications Ser. No. 268,132 filed June 30, 1972 entitled ELECTROMAGNETIC SUSPENSION AND GUIDE SYSTEM FOR MAGNETICALLY SUSPENDED VEHICLES, Ser. No. 268,133 filed June 30, 1972 (now U.S. Pat. No. 3,797,403) and entitled ELECTROMAGNET SUSPENSION AND DRIVE SYSTEM, Ser. No. 280,073 filed Aug. 11, 1972 (now U.S. Pat. No. 3,780,668) and entitled ELECTROMAGNETIC SUSPENSION and/or GUIDE SYSTEM ESPECIALLY FOR MAGNETICALLY SUSPENDED VEHICLES, Ser. No. 280,074 filed Aug. 11, 1972 entitled ELECTROMAGNETIC SUSPENSION AND GUIDE SYSTEM PARTICULARLY FOR VEHICLES and Ser. No. 292,638 filed Sept. 27, 1972 and entitled CONTACT SYSTEM FOR HIGH SPEED ELECTRICALLY OPERATED VEHICLES.

FIELD OF THE INVENTION

The present invention relates to armature-rail systems for electromagnetic suspension vehicles and especially electromagnetically propelled and suspended or guided vehicles.

BACKGROUND OF THE INVENTION

As pointed out in the copending applications mentioned earlier, considerable effort has been put into the development of high speed low-friction vehicle systems for intra-urban and inter-urban and light transport systems for carrying passengers at high speeds over long or short distances. With increasing congestion in urban areas, failure of conventional rapid-transit systems and increased urbanization, the problem of carrying passengers at high speeds over long or short distances by rail or track has been faced in many localities and numerous proposals for solving the problems have been put forward.

A proposal, which has been found to be both practical and advantageous, is the use of high speed rail or track vehicles using magnetic suspension and/or guidance for reducing the frictional interaction between the vehicle and the supporting track bed. In conjunction with these systems, there have been developed arrangements for driving the vehicles which utilize induction motors of the linear type.

In electromagnetic-suspension vehicles the track carrying an armature or rail, which extends substantially continuously over the full length of the right-of-way while the vehicle, carries an electromagnet juxtaposed with the armature or rail (hereinafter armature rail) through which an electromagnetic flux path closes across a pair of gaps generally defined between arms and shanks of the yoke or core of the electromagnet and the armature rail. When the magnetic force is of the attractive type, the electromagnet (and vehicle) may be suspended beneath the armature rail so that the magnetic field balances the gravitational force acting upon the vehicle to maintain a gap or clearance between the latter and the track or bed. In electromagnetic guidance systems, the vehicle is positioned laterally by similar electromagnetic assemblies comprising an armature rail on the track and an electromagnet on the vehicle. To counteract increases in loading, the electromagnet for suspension or guidance may be provided with servocircuits adapted to increase the energization current with increases in loading, or to decrease the energization current with decreases in loading, thereby maintaining a substantially constant gap width.

In high speed vehicular transport systems, in conjunction with magnetic suspension vehicles or otherwise, it has been proposed to provide linear induction motors in which a field coil carried by the vehicle interacts magnetically with a reaction rail mounted upon the track or bed and in which an electric current is inducted to produce a reactive field, thereby propelling the vehicle along the track.

In prior-art systems, so-called two-sided linear induction motors have been provided centrally of the vehicle to cooperate with a centrally disposable reaction rail which was flanked by opposite sides of the two-sided linear induction motor. Along the outer edges of the track and toward the outer sides of the vehicles, electromagnetic suspension and guidance assemblies of the character previously described, were arranged to support and position the vehicle. Such systems involve high material and mounting costs and, because of the arrangement of reaction rails and suspension or guide armature rails, created difficulties in adjusting the relative positions of all of the rails.

OBJECTS OF THE INVENTION

It is the principal object of the present invention to provide an improved system for high speed vehicles of the character described whereby the aforementioned disadvantages can be obviated.

It is another object of the invention to provide an improved electromagnetical suspension and/or guide system and a linear induction motor arrangement, especially for high speed low friction vehicles, which reduce the rail-mounting costs and the difficulties in properly positioning the rail portion.

Still another object of the invention is to provide an armature and reaction rail system which extends the principles set forth in the copending applications mentioned earlier.

SUMMARY OF THE INVENTION

These objects and others which will become apparent hereinafter, are obtained in accordance with the present invention by providing an armature rail of soft magnetic characteristics, e.g., of iron, for juxtaposition with the electromagnet of the suspension or guide means of the vehicle, which comprises a surface layer of high electrically conductive material serving as the reaction rail for a one-sided linear induction motor of the vehicle. The soft-magnet core thus serves, in addition as part of the magnetic return path for the flux of the linear induction motor.

The multipurpose rail of the present invention, which constitutes the armature or the electromagnetic suspension and/or guide means and the reaction rail for the linear induction motor, eliminates the difficulties hitherto encountered with respect to adjusting the positions of the separate-purpose rails of conventional systems, has a compact construction of relatively low cost, allows the linear induction motor to be relatively small and hence reduces the vehicle weight and costs, permits the edge effects hitherto encountered with linear induction motors to be minimized and affords good heat dissipation from the reaction layer, the core acting as a heat sink and high-surface-area heat-dissipating body for this purpose.

According to an important feature of the present invention, the soft-magnet core of the multipurpose rail is of U-profile or U-section with a pair of parallel spaced apart shanks extending codirectionally from a web interconnecting the shanks. The high-conductivity layer, e.g., of aluminum or copper, can be applied to an inner or to an outer surface of one of the shanks or of the web. An advantage of the application of the high conductive layer to the inner surface of one of the shanks or of the web is that this layer is at least partly enclosed and the linear induction motor is at least in part shielded by the layer so that environment (atmospheric or weather) effects upon the layer and the linear induction motor coils is minimized. However, the system also has the disadvantage that the linear induction motor must be dimensioned to fit between the shanks and hence is of limited size. Thus it is preferred to apply the layer to an external surface of one of the shanks or the web.

According to another feature of the invention, the armature rail forms part of the magnetic suspension and the shanks or arms thereof extend downwardly while the web is horizontal, the web or one of the arms being used to affix the rail to the track support while the other arm or the web carries the high-conductive layer. The electric suspension system may also include an electromagnet carried by the vehicle and having a U-section or U-profile core (see the aforementioned applications) around the web of which is wound the suspension coil. It may be noted that the use of a linear induction motor and reaction layer between the shanks of the cores is also disadvantageous when the vehicle is intended to negotiate relatively sharp curves since a greater clearance is required between the shanks or arms of the rail and the linear induction motor coils in this case.

It has also been found that the so-called iron losses of the magnetic path closed through the rail can be reduced when the latter consists of soft iron sheets which are laminated together, the planes of the laminations extending parallel to the direction of travel of the vehicle. A particularly advantageous configuration makes use of lamination planes which are perpendicular to the high-conductive reaction layer, thereby reducing eddy currents in the core of the armature and induced by the linear induction motor to a minimum. However, I may also laminate the armature rail so that the laminations in the portion of the body carrying the reaction rail run parallel thereto.

Where the laminations of the portion of the rail core carrying the layer are prependicular to the layer, the eddy currents generated by the motor flux is concentrated only at the points at which the flux path intersects the rail (influx and outflux positions), thereby reducing eddy current development in the rail system generally. This has the additional advantage that the suspension magnets generate little or no eddy currents in the applied reaction layer of high electrical conductivity. Since the eddy current effect is minimized, higher vehicle speeds can be attained. It should be noted that, at the highest vehicle speeds, changes in the suspension flux are relatively small so that with especially high speed vehicles the layers may be perpendicular to the reaction layer in a preferred case, thereby minimizing eddy current development even at the point where the induction motor flux enters and leaves the rail.

DESCRIPTION OF THE DRAWING

The above and other objects, features and advantages of the present invention will become more readily apparent from the following description, reference being made to the accompanying drawing in which.

SPECIFIC DESCRIPTION

Figure 9:
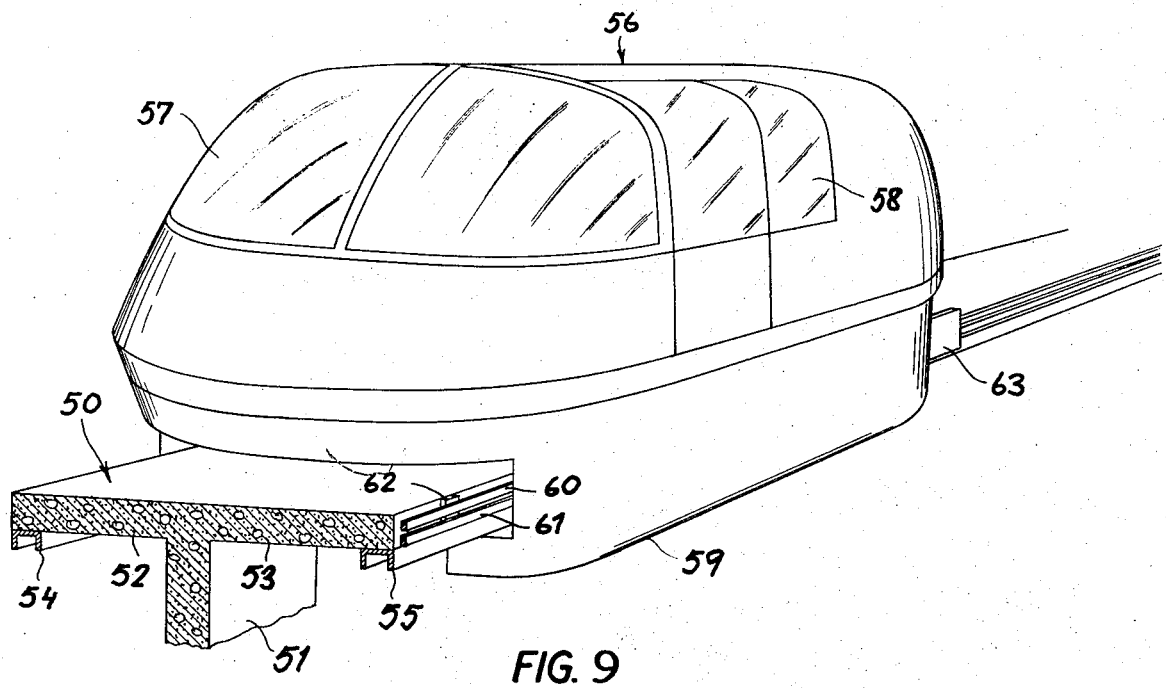
FIG. 9 is a perspective view diagrammatically illustrating a vehicle system according to the invention.

Referring first to FIG. 9, it may be seen that a vehicle system according to the invention can comprise a generally horizontal track 50 mounted upon spaced apart pylons or posts 51 and of generally T-shaped profile so that the cross bar of the T provides outwardly extending flanges 52 and 53.

Figure 1:
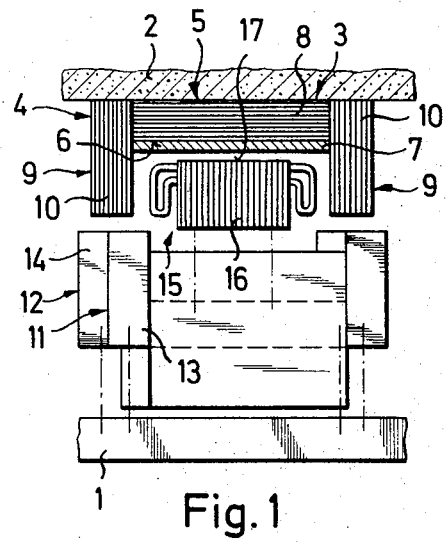
FIG. 1 is a vertical cross-sectional view through a rail embodying the present invention.
Figure 2:
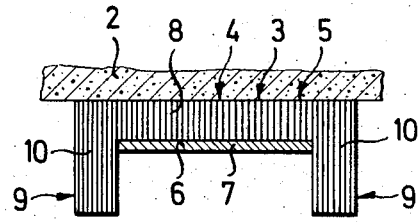
FIG. 2 is a view of the rail of the system of FIG. 1 but with a different lamination system.
Figure 4:
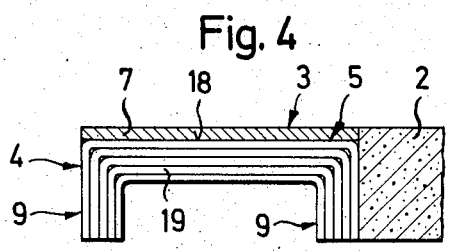
FIG. 4 is a view similar to FIG. 3 showing the rail with a different lamination system.
Figure 3:
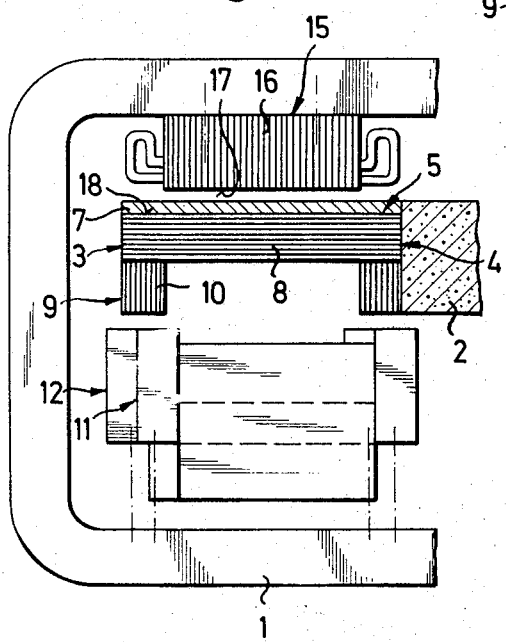
FIG. 3 is a view similar to FIG. 1 showing an arrangement in which the linear induction motor coils are juxtaposed with an outer surface of the web.
Figure 5:
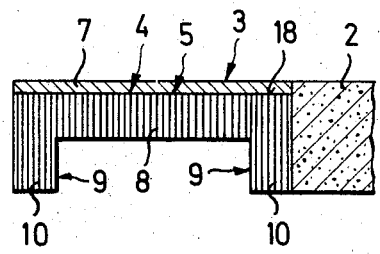
FIG. 5 is a view similar to FIG. 4 representing still another lamination arrangement for the rails.
Figure 6:
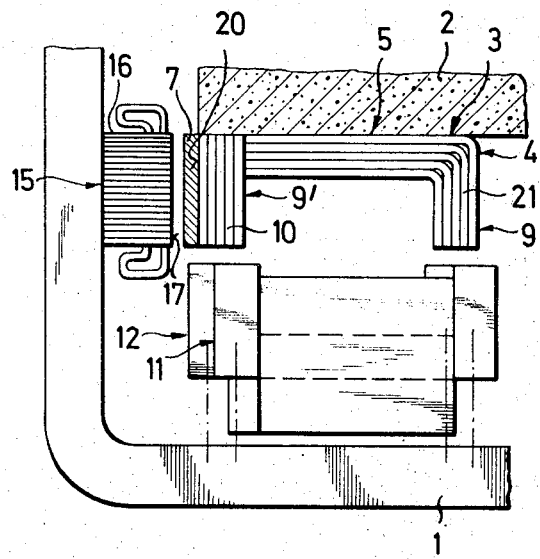
FIG. 6 is a view similar to FIG. 3 in which the linear induction motor confronts a flange of the rail.
Figure 7:
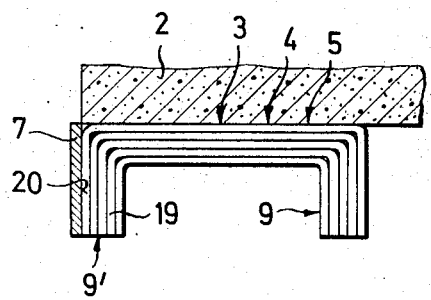
FIG. 7 is a view of a modified rail for the system in FIG. 6 using a different lamination arrangement.

Along the outer edges of these flanges, there may be affixed armature rails 54 and 55 of U-shaped profile which are provided with reaction layers of high electrical conductivity, are laminated and are juxtaposed with respective suspension electromagnets and one-sided linear induction motors as illustrated in FIGS. 1, 3 or 6, the rails 54 and 55 having the construction shown for any of the rails of FIGS. 1 through 8.

Figure 10:
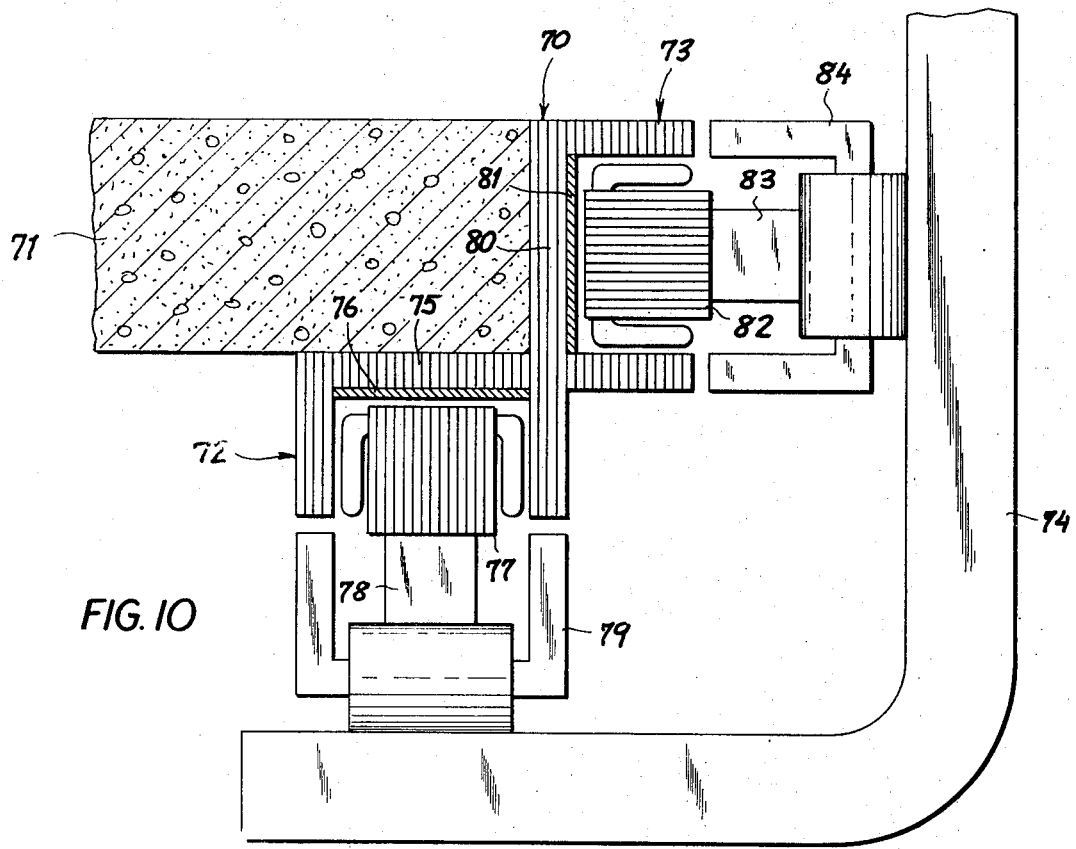
FIG. 10 is a cross-sectional view illustrating another modification of the present invention.

The vehicle 56 is here shown to have an operator cab 57 and a passenger compartment 58 as described in the aforementioned copending applications, and aprons 59 overhanging the edges of the flanges 52 and 53 and carrying both the linear induction motors and the suspension electromagnets. In the embodiment illustrated, a pair of current-carrying rails 60 and 61 are mounted upon insulating pedestals 62 (see application Ser. No. 292,173) and are engaged by contact shoes represented at 63 to deliver electric current to the linear induction motors and the suspension electromagnets. As described in the previous copending applications, moreover, guide electromagnets and respective rails may also be provided and/or suspension electromagnets may be oriented to act as lateral-guide electromagnets. In FIG. 10, there is shown an arrangement in which a single rail functions as a guide electromagnet, a suspension electromagnet and a pair of linear induction motor armatures.

In FIG. 10 the rail 70 is mounted on the edge of the flange 71 of a support and comprises a pair of U-profiles 72 and 73, respectively, for the electromagnetic suspension and the electromagnet guidance of a vehicle, one apron of which is represented at 74. The web 75 of the U-profile 72 carries a copper layer 76 of high electrical conductivity, juxtaposed with the linear induction motor coil 77 which is mounted by a pedestal 78 on the suspension electromagnet 79. The web 80 of U-profile 73 carries a copper layer 81 as a reaction member for the linear induction motor 82 mounted by pedestal 83 on lateral-guide electromagnet 84. The laminations of the rail 70 run in the vertical direction so that, in the case of reaction layer 76, they are perpendicular to the layer and in the case of reaction layer 81 are parallel thereto. Otherwise the system of FIG. 10 operates with the same principles as will be illustrated hereinafter in connection with FIGS. 1 through 8.

In FIG. 1, in which only one side of the overall suspension and drive system for an electromagnetically suspended vehicle has been illustrated, there is shown a vehicle 1 (e.g., only the apron of which has been illustrated) adapted to negotiate a track or support 2 on which the rail 3 is mounted. The rail 3 comprises a soft magnet rail core 4 of U-profile having a base or web 5 and a pair of lateral downwardly extending parallel shanks 9 connected to the web 5.

The web 5 is formed along its inner surface 6 with a high conductivity layer 7, in this case of aluminum, and is composed of soft-iron lamellae 8 which run parallel to the aluminum layer 7. The lateral shanks 9 are likewise laminated from sheets 10 extending perpendicular to the aluminum layer 7 and the sheets 8 constituting the web.

As described in the copending applications mentioned earlier, the vehicle 1 is provided with a row of controlled electromagnets 11 and 12 which may be staggered from left to right in succession along the vehicle so that certain of the electromagnets 11 lie to the right and certain of the electromagnets 11 lie to the left with respect to a vertical median plane through each of the lateral shanks 9. The electromagnets 11 and 12 have cores 13 and 14 of U-profile with lateral shanks extending toward the shanks 9, i.e., upwardly. The parallel shanks of the electromagnets 11 and 12 are spaced apart with the same spacing as the shanks 9 of the rail. By controlling the current through the groups of electromagnets offset to the left and to the right, respectively, it is possible to laterally position the vehicle as well as to suspend the latter with a substantially constant gap spacing from the rail.

At each side of the vehicle, there is at least one one-sided linear induction motor 15 having a horizontal orientation and supported at 16 upon the vehicle, the linear induction motor being received within the space between the lateral shanks 9 of the rail 3. The active surface of the stator 16 conforms the reaction rail constituted by the aluminum layer 17 to drive the vehicle. In the system illustrated in FIG. 1, only at the points at which the motor flux enters and leaves the web 5 is there a tendency to generate eddy currents in the core 4 and these regions are of small volume.

When the rail of FIG. 2 is substituted for that of FIG. 1, even these eddy current regions are eliminated since the aluminum layer 7 is likewise perpendicular to the sheets 8 of the web 5. The eddy current produced by the suspension electromagnets during buildup and collapse of the suspension field are minimal and can be avoided entirely by laminating the shanks 9 in horizontal planes.

In FIG. 3, there has been shown another construction in which the web 5 extends the full width of the core 4 and is likewise laminated with horizontal sheets 8, the rail 3 being mounted by an inner shank along the outer edge of the support 2. In this case, the aluminum layer 7 can be applied on the external surface 18 of the web 5 and can be juxtaposed with a linear induction motor 15 through 17 rotated through 180° with respect to the linear induction motor of FIG. 1 and removed from between the shanks 9. This arrangement has been found to be advantageous where sharp curves are encountered for reasons which have already been noted. In FIG. 4, there has been illustrated a rail which can be substituted for the rail of FIG. 3 and in which the sheets 19 are of U-section, the eddy currents produced by the motor being limited to the regions in which the motor flux enters and leaves the rail. In the system of FIG. 5, however, the lamination direction corresponds to that of FIG. 2 and even these eddy currents are avoided.

Figure 8:
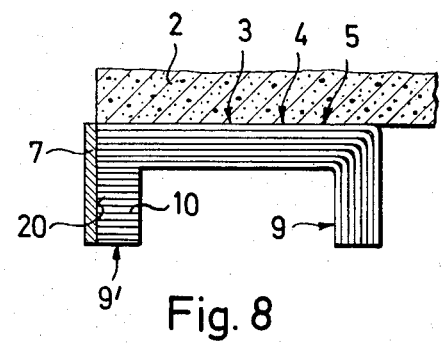
FIG. 8 is a view similar to FIG. 7 representing still another lamination modification.

FIG. 6 shows a rail in which the linear induction motor 15 through 17 confronts a shank 9' whose outer surface 20 is formed with the aluminum layer 7. Here the laminations of the shank are parallel to those of layer 7, a similar construction being shown in FIG. 7 in which the rail is composed of U-profile sheets. The sheets 21 of the rail of FIG. 6, however, are of angle profile, and butt against the parallel laminations 10 of shank 9'. In FIG. 8, the web and one shank 9 of the rail is composed of angle-profile sheets while the sheets 10 of the other shank 9' carrying the aluminum layer 7 are parallel to the web and perpendicular to the aluminum layer 7.

I claim:

1. A suspension and drive system for an electromagnetically suspended and guided vehicle, the system comprising a track, a magnetically permeable rail extending along said track, a vehicle adapted to travel along said track, a first electromagnetic means on said vehicle confronting said rail and juxtaposed therewith for producing a first closed magnetic field therethrough for suspending and guiding said vehicle relative to said track, a continuous high-conductivity reaction layer formed longitudinally directly on said rail and integral therewith while having an electrical conductivity in excess of that of the body of the rail, and a one-sided linear induction motor forming second electromagnetic means carried by said vehicle independently of said first electromagnetic means and interacting with said layer for propelling said vehicle along said track.

2. The system defined in claim 1 wherein said rail is of U-profile and comprises a web portion and a pair of parallel shank portions having inner and outer surfaces, said layer being formed on one of said surfaces.

3. The system defined in claim 2 wherein said layer is formed on one of said inner surfaces and said motor is received in part between said shank portions.

4. The system defined in claim 2 wherein at least, the portion of said rail carrying said layer is laminated of soft magnetic sheet.

5. The system defined in claim 4 wherein said sheets are parallel to said layer.

6. The system defined in claim 4 wherein said sheets are perpendicular to said layer.

7. The system defined in claim 2 wherein said layer is composed of aluminum and is formed on an outer surface on one of said shank portions.

8. The system defined in claim 2 wherein said layer is aluminum and is formed on an outer surface of said web portion.

9. The system defined in claim 2 wherein said layer is aluminum and is formed on the inner surface of said web portion.

10. The system defined in claim 2 wherein said track is horizontal and is provided with a respective such rail along opposite horizontally spaced edges thereof, said vehicle having a pair of aprons flanking said edges and each carrying a respective electromagnet and linear induction motor juxtaposed with the respective rail, said electromagnets suspending said vehicle from said rails.

* * * * *